US011782150B2

(12) United States Patent
Eo

(10) Patent No.: US 11,782,150 B2
(45) Date of Patent: Oct. 10, 2023

(54) METHOD AND APPARATUS FOR PROCESSING CFAR OF SENSOR DATA

(71) Applicant: Samsung Electronics Co., Ltd., Suwon-si (KR)

(72) Inventor: Min Sung Eo, Anyang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 322 days.

(21) Appl. No.: 17/133,937

(22) Filed: Dec. 24, 2020

(65) Prior Publication Data

US 2022/0050196 A1    Feb. 17, 2022

(30) Foreign Application Priority Data

Aug. 11, 2020  (KR) .................. 10-2020-0100588

(51) Int. Cl.
  *G01S 13/72*   (2006.01)
  *G01S 7/35*    (2006.01)
  (Continued)

(52) U.S. Cl.
  CPC .............. *G01S 13/726* (2013.01); *G01S 7/35* (2013.01); *G01S 13/5246* (2013.01); *G01S 13/931* (2013.01); *G01S 7/356* (2021.05)

(58) Field of Classification Search
  CPC .............................. G01S 7/2923; G01S 7/2927
  (Continued)

(56) References Cited

U.S. PATENT DOCUMENTS 3,995,270 A * 11/1976 Perry .................... G01S 7/2927
  327/72
4,074,264 A *  2/1978 Wilmot ................. G01S 7/2923
  342/197
(Continued)

FOREIGN PATENT DOCUMENTS

JP            6643390 B2     2/2020
KR       10-0646873 B1    11/2006
(Continued)

OTHER PUBLICATIONS

P. P. Gandhi and S. A. Kassam, "Analysis of CFAR processors in nonhomogeneous background," in IEEE Transactions on Aerospace and Electronic Systems, vol. 24, No. 4, pp. 427-445, Jul. 1988, doi: 10.1109/7.7185. (Year: 1988).*

(Continued)

*Primary Examiner* — Bernarr E Gregory
(74) *Attorney, Agent, or Firm* — NSIP Law

(57) ABSTRACT

A method and apparatus for processing a constant false alarm rate (CFAR) of sensor data are disclosed. The method includes determining whether a skip condition for an averaging operation on a current frame of radar data is satisfied based on a data variation level of the current frame, skipping the averaging operation on the current frame and obtaining previous mean data of a previous frame of the radar data, in response to the skip condition being satisfied, generating current mean data by performing the averaging operation on the current frame, in response to the skip condition not being satisfied, and performing a CFAR operation on the current frame based on one of the previous mean data or the current mean data.

16 Claims, 10 Drawing Sheets

(51) Int. Cl.
*G01S 13/524* (2006.01)
*G01S 13/931* (2020.01)
*G01S 13/00* (2006.01)

(58) Field of Classification Search
USPC .......................................................... 342/93
See application file for complete search history.

(56) References Cited

U.S. PATENT DOCUMENTS

| | | | |
|---|---|---|---|
| 4,213,127 | A | 7/1980 | Cole |
| 4,360,811 | A * | 11/1982 | Cantwell, Jr. ......... G01S 7/2927 342/93 |
| 4,542,381 | A | 9/1985 | Wilhelm |
| 5,808,579 | A | 9/1998 | Rademacher |
| 7,741,992 | B2 | 6/2010 | Wang et al. |
| 11,656,322 | B2 * | 5/2023 | Aydogdu .............. G01S 13/931 342/60 |
| 2013/0201054 | A1 * | 8/2013 | Wang .................... G01S 7/2927 342/93 |
| 2019/0107620 | A1 | 4/2019 | Borgonovo et al. |
| 2020/0400809 | A1 * | 12/2020 | Longman .............. G01S 7/2927 |

FOREIGN PATENT DOCUMENTS

| | | |
|---|---|---|
| KR | 10-1017013 B1 | 2/2011 |
| KR | 10-1871874 B1 | 6/2018 |
| KR | 10-1951034 B1 | 2/2019 |

OTHER PUBLICATIONS

S. D. Himonas and M. Barkat, "Automatic censored CFAR detection for nonhomogeneous environments," in IEEE Transactions on Aerospace and Electronic Systems, vol. 28, No. 1, pp. 286-304, Jan. 1992, doi: 10.1109/7.135454. (Year: 1992).*

R. S. Narasimhan, A. Vengadarajan and K. R. Ramakrishnan, "Design and efficient implementation of censored cell averaging CFAR for non-homogeneous background," 2018 IEEE Aerospace Conference, 2018, pp. 1-12, doi: 10.1109/AERO.2018.8396685. (Year: 2018).*

* cited by examiner

METHOD AND APPARATUS FOR PROCESSING CFAR OF SENSOR DATA

CROSS-REFERENCE TO RELATED APPLICATIONS

This application claims the benefit under 35 USC § 119(a) of Korean Patent Application No. 10-2020-0100588 filed on Aug. 11, 2020, in the Korean Intellectual Property Office, the entire disclosure of which is incorporated herein by reference for all purposes.

BACKGROUND

Field

The following description relates to a method and apparatus for processing a constant false alarm rate (CFAR) of sensor data.

Description of Related Art

Advanced driver assistance systems (ADAS) are used to enhance safety and convenience for drivers by implementing sensors provided inside or outside a vehicle. The ADAS may assist a driver by detecting objects and alerting the driver of hazardous road conditions.

The sensors used for the ADAS may include devices such as a camera, an infrared sensor, an ultrasonic sensor, a light detection and ranging (lidar) sensor, and a radio detection and ranging (radar) sensor. Among these, the radar sensor may reliably and stably measure an object present adjacent to a vehicle without being affected by environmental conditions including, for example, weather, when compared to optical sensors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a radio detection and ranging (radar) signal processing method, including determining whether a skip condition for an averaging operation on a current frame of radar data is satisfied based on a data variation level of the current frame, skipping the averaging operation on the current frame and obtaining previous mean data of a previous frame of the radar data, in response to the skip condition being satisfied, generating current mean data by performing the averaging operation on the current frame, in response to the skip condition not being satisfied, and performing a constant false alarm rate (CFAR) operation on the current frame based on one of the previous mean data or the current mean data.

The data variation level may be estimated based on at least one of an ego velocity of a vehicle or frames per second (FPS) of a radar sensor.

The determining of whether the skip condition is satisfied may include determining that the skip condition is satisfied, in response to an ego velocity of a vehicle being less than a velocity threshold.

The determining of whether the skip condition is satisfied may include determining that the skip condition is satisfied, in response to FPS of a radar sensor being greater than an FPS threshold.

The determining of the skip condition may include determining the skip condition for the averaging operation on the current frame based on the number of frames skipped up to a current point in time.

The determining of whether the skip condition is satisfied may include determining that the skip condition is not satisfied, in response to the number of frames skipped up to a current point in time being greater than a skip threshold.

The generating of the current mean data may include performing the averaging operation on range-Doppler maps of channels of the current frame.

A direction of arrival (DoA) of the current frame may be estimated based on a result of performing the CFAR operation on the current frame.

A vehicle including an apparatus implementing the radar signal processing method may be configured to be controlled based on the estimated DoA.

The radar data may be generated based on a radar reception signal received through an antenna array of a radar sensor.

In another general aspect, there is provided a radio detection and ranging (radar) signal processing method, including determining whether a skip condition for an averaging operation on a first frame of radar data is satisfied based on a data variation level of the first frame, generating first mean data by performing the averaging operation on the first frame, in response to the skip condition for the first frame not being satisfied, storing the first mean data in a memory, performing a constant false alarm rate (CFAR) operation on the first frame based on the first mean data, determining whether a skip condition for an averaging operation on a second frame of the radar data is satisfied based on a data variation level of the second frame, loading the first mean data from the memory, in response to the skip condition for the second frame being satisfied, and performing a CFAR operation on the second frame based on the first mean data.

The data variation level of the first frame may be estimated based on at least one of an ego velocity of a vehicle or frames per second (FPS) of a radar sensor.

The determining of the skip condition for the first frame may include determining the skip condition for the averaging operation on the first frame based on the number of frames skipped up to a current point in time.

In another general aspect, there is provided a radio detection and ranging (radar) signal processing apparatus, including a radar sensor configured to transmit a radar transmission signal through an antenna array, and to receive a radar reception signal through the antenna array in response to the radar transmission signal being reflected by a target, and a processor configured to generate radar data based on the radar transmission signal and the radar reception signal, to determine whether a skip condition for an averaging operation on a current frame of the radar data is satisfied based on a data variation level of the current frame, to skip the averaging operation on the current frame and obtain previous mean data of a previous frame of the radar data in response to the skip condition being satisfied, and to perform a constant false alarm rate (CFAR) operation on the current frame based on the previous mean data.

The data variation level of the current frame may be estimated based on at least one of an ego velocity of a vehicle or frames per second (FPS) of the radar sensor.

The processor may be configured to determine whether the skip condition for the averaging operation on the current frame is satisfied based further on the number of frames skipped up to a current point in time.

In another general aspect, there is provided a vehicle including a radio detection and ranging (radar) sensor configured to transmit a radar transmission signal through an antenna array, and receive a radar reception signal through the antenna array in response to the radar transmission signal being reflected by a target, a processor configured to generate radar data based on the radar transmission signal and the radar reception signal, to determine whether a skip condition for an averaging operation on a current frame of the radar data is satisfied based on a data variation level of the current frame, to skip the averaging operation on the current frame and obtain previous mean data of a previous frame of the radar data in response to the skip condition being satisfied, and to perform a constant false alarm rate (CFAR) operation on the current frame based on the previous mean data, and a controller configured to control the vehicle based on a direction of arrival (DoA) estimated based on the CFAR operation.

The data variation level of the current frame may be estimated based on at least one of an ego velocity of the vehicle or frames per second (FPS) of the radar sensor.

The processor may be configured to determine the skip condition for the averaging operation on the current frame is based on the number of frames skipped up to a current point in time.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
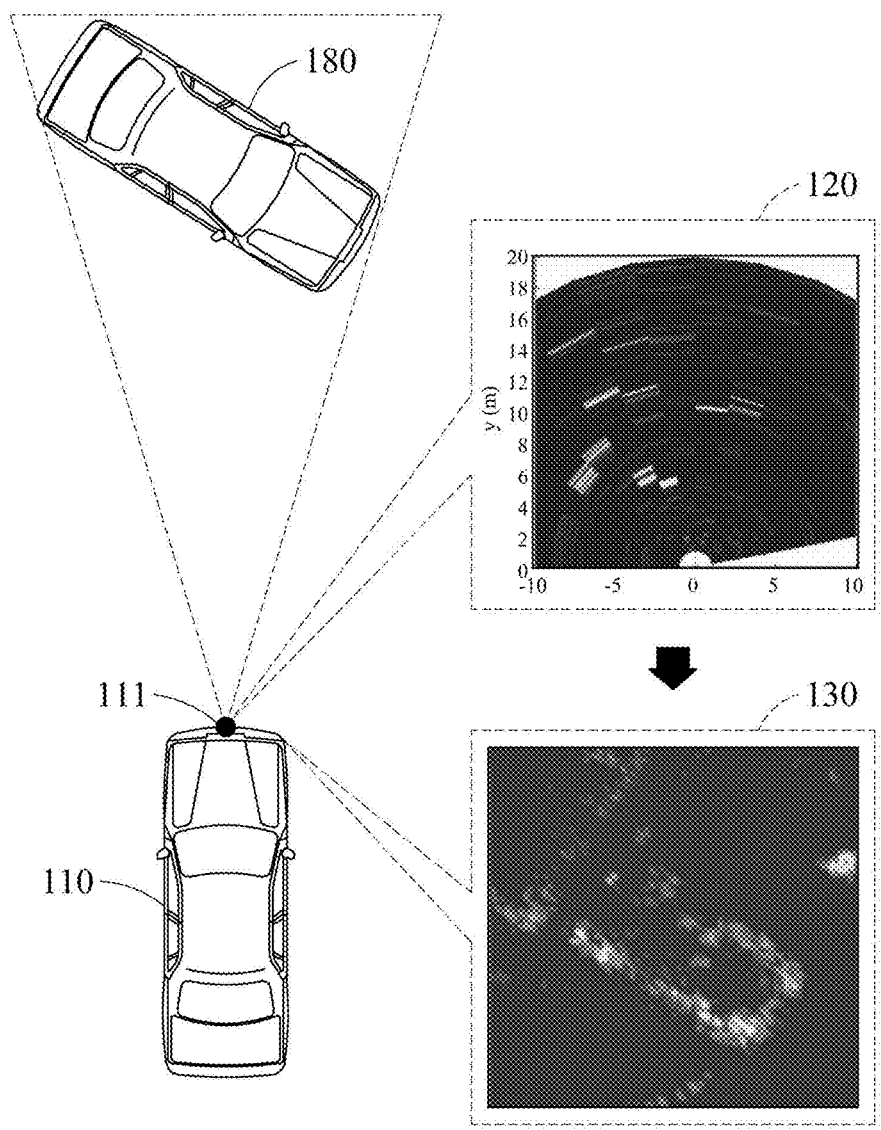
FIG. 1 illustrates an example of recognizing a surrounding environment through a radio detection and ranging (radar) signal processing method.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will be redundant.

Hereinafter, examples will be described in detail with reference to the accompanying drawings, and like reference numerals in the drawings refer to like elements throughout.

FIG. 1 illustrates an example of recognizing a surrounding environment through a radio detection and ranging (radar) signal processing method. Referring to FIG. 1, a radar signal processing apparatus 110 may detect information associated with a target 180 that includes, for example, a range, a velocity, and a direction, by analyzing a radar signal received by a radar sensor 111. The radar sensor 111 may be disposed inside or outside the radar signal processing apparatus 110. The radar signal processing apparatus 110 may detect the information associated with the target 180 present in front based on data collected from another sensor, for example, an image sensor, in addition to the radar signal received by the radar sensor 111.

The radar signal processing apparatus 110 may be provided in a vehicle as illustrated in FIG. 1. The vehicle may perform an operation, such as, for example, adaptive cruise control (ACC), autonomous emergency braking (AEB), blind spot detection (BSD), accident avoidance, and lane change assistance (LCA), based on a range to the target 180 that is detected by the radar signal processing apparatus 110. The term "range" used herein may indicate a distance, for example, a range from A to B may indicate a distance from A to B, and a range between A and B may indicate a distance between A and B. The terms "range" and "distance" may thus be used interchangeably.

Further, the radar signal processing apparatus 110 may generate a nearby map 130 of surroundings in addition to detecting a range. The map 130 may indicate locations of various targets present around the radar signal processing apparatus 110, and such nearby targets may include dynamic objects such as vehicles and human beings, or stationary or background objects such as guardrails and traffic lights, as examples.

To generate the map 130, a single scanning technique may be used. Through the single scanning technique, the radar signal processing apparatus 110 may obtain a single scan image 120 from a sensor and generate the map 130 from the obtained single scan image 120. The single scan image 120 may be generated from a radar signal sensed by a single radar sensor, for example, the radar sensor 111, and may represent, at a relatively high resolving power, ranges or distances indicated by radar signals received from an elevation angle. For example, a horizontal axis of the single scan image 120 in the example of FIG. 1 indicates a steering angle of the radar sensor 111, and a vertical axis of the single scan image 120 indicates a range from the radar sensor 111 to the target 180. The format of a single scan image is not limited to that illustrated in FIG. 1, and may be represented by another format based on design.

The steering angle may indicate an angle corresponding to a target direction from the radar signal processing apparatus 110 towards the target 180. For example, the steering angle may be an angle between the target direction and a driving or traveling direction of the radar signal processing apparatus 110 or the vehicle including the radar signal processing apparatus 110. The steering angle is described herein based mainly on a horizontal angle, but is not limited thereto. For example, the steering angle may also be applied to an elevation angle.

In an example, the radar signal processing apparatus 110 may obtain information about a shape of the target 180 through a multi-radar map. The multi-radar map may be generated by combining a plurality of radar scan images. For example, the radar signal processing apparatus 110 may generate the map 130 by spatiotemporally combining multiple radar scan images obtained as the radar sensor 111 moves. The map 130 may be a type of a radar image map and used for pilot parking, for example.

In an example, to generate the map 130, the radar signal processing apparatus 110 may use direction of arrival (DoA) information. The DoA information may indicate information indicating a direction in which a radar signal reflected from a target is received. The radar signal processing apparatus 110 may identify a direction in which the target is present based on the radar sensor 111 using the DoA information. Thus, such DoA information may be used to generate radar scan data and a nearby map of surroundings.

In an example, the radar information, such as, for example, range, velocity, DoA, and map information, associated with the target 180 that is generated by the radar signal processing apparatus 110 may be used to control the vehicle in which the radar signal processing apparatus 110 is provided. For example, the controlling of the vehicle may include velocity and steering control, such as, for example, ACC, AEB, BSD, and LCA. A control system of the vehicle may control the vehicle directly or indirectly using the radar information.

Figure 2:
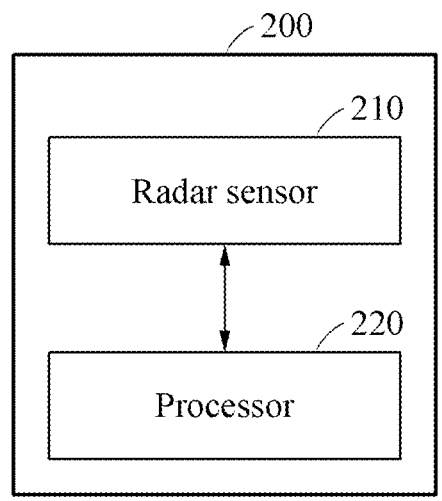
FIG. 2 illustrates an example of a radar signal processing apparatus.

FIG. 2 illustrates an example of a radar signal processing apparatus. Referring to FIG. 2, a radar signal processing apparatus 200 includes a radar sensor 210 and a processor 220. The radar sensor 210 may externally radiate a radar signal, and receive a signal that is obtained when the radiated radar signal is reflected from a target. The radiated radar signal may be referred to herein as a radar transmission signal, and the received signal may be referred to herein as a radar reception signal. The radar transmission signal may include a chirp signal of which a carrier frequency is modulated based on a frequency modulation model. The radar transmission signal may have a frequency that changes within a band. For example, the frequency of the radar transmission signal may change linearly in the band.

The radar sensor 210 may include an antenna array, and transmit the radar transmission signal and receive the radar reception signal through the antenna array. The antenna array may include a plurality of antenna elements. In an example, through the antenna elements, multiple-input and multiple-output (MIMO) may be implemented. In this example, a plurality of MIMO channels may be formed by the antenna elements. For example, a plurality of channels corresponding to M×N virtual antennas may be formed through M transmitting antenna elements and N receiving antenna elements. In this example, radar reception signals received respectively through the channels may have different phases based on directions in which they are received.

Based on the radar transmission signal and the radar reception signal, radar data may be generated. For example, the radar sensor 210 may transmit a radar transmission signal through the antenna array based on a frequency modulation model, and receive a radar reception signal through the antenna array when the radar transmission signal is reflected by a target. The radar sensor 210 may then generate an intermediate frequency (IF) signal based on the radar transmission signal and the radar reception signal. The IF signal may have a frequency corresponding to a difference between a frequency of the radar transmission signal and a frequency of the radar reception signal. The processor 220 may generate radar data by performing sampling on the IF signal. The radar data may be raw data of an IF.

The processor 220 may generate information associated with the target based on the radar data, and use the generated information. For example, the processor 220 may perform a range fast Fourier transform (FFT), a Doppler FFT, constant false alarm rate (CFAR) detection, and DoA estimation, and obtain the information associated with the target that includes, for example, a range, a velocity, and a direction. The information associated with the target may be provided for various applications, such as, for example, ACC, AEB, BSD, and LCA.

Figure 3:
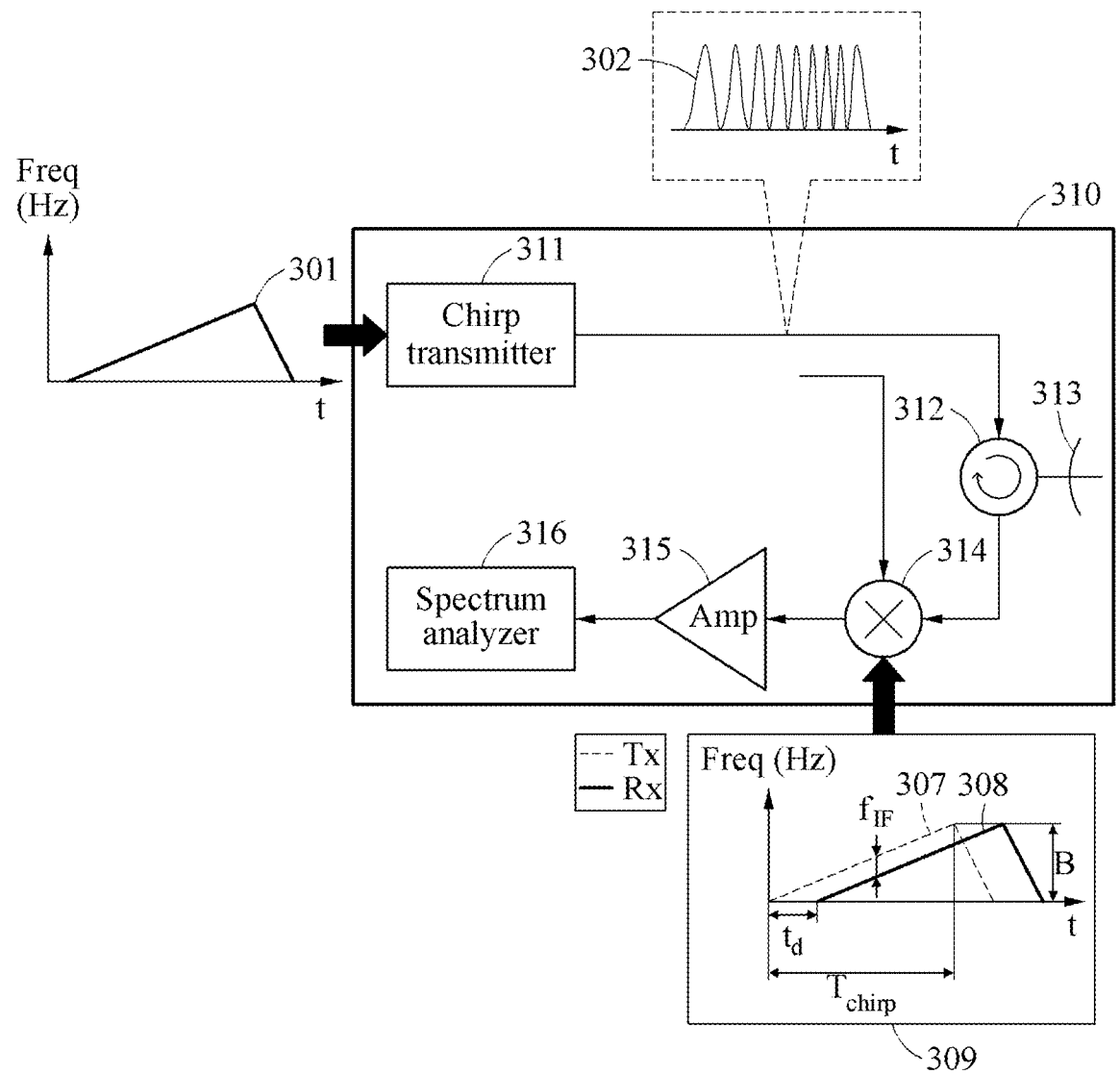
FIG. 3 illustrates an example of a radar sensor.

FIG. 3 illustrates an example of a radar sensor. Referring to FIG. 3, a radar sensor 310 includes a chirp transmitter 311, a duplexer 312, an antenna 313, a frequency mixer 314, an amplifier 315, and a spectrum analyzer 316. The radar sensor 310 may radiate a signal through the antenna 313 and receive a signal through the antenna 313. Although the antenna 313 is illustrated as a single antenna in FIG. 3, the antenna 313 may include at least one transmitting antenna element and at least one receiving antenna element. For example, the antenna 313 may be an antenna array. For example, the antenna 313 may include three or more receiving antenna elements. In this example, the receiving antenna elements may be separated from each other at the same intervals.

The radar sensor 310 may be, for example, an mmWave radar, and may estimate a range to a target by analyzing a time-of-flight (ToF) and a change in a waveform of a radar signal. Here, the ToF may indicate an amount of time used for a radiated electric wave to return after striking on a target. For example, the mmWave radar may detect a front side irrespective of a change in an external environment, for example, fog, rain, and the like, compared to an optical sensor such as, for example, a camera. In addition, the mmWave radar may be more effective in terms of performance relative to cost compared to a light detection and ranging (lidar) sensor. Thus, the mmWave radar may complement a flaw of a camera. The radar sensor 310 may be embodied as, for example, a frequency-modulated continuous-wave (FMCW) radar, but not limited thereto. The FMCW radar may be robust against external noise.

The chirp transmitter 311 may generate a frequency-modulated (FM) signal 302 of which a frequency changes over time. For example, the chirp transmitter 311 may generate the FM signal 302 by performing frequency modulation based on a frequency modulation characteristic of a frequency modulation model 301. The FM signal 302 may also be referred to as a chirp signal. The frequency modulation model 301 may refer to a model indicating a change in a carrier frequency of a radar transmission signal for a given transmission time. In the frequency modulation model 301, a vertical axis may indicate a carrier frequency and a horizontal axis may indicate time. For example, the frequency modulation model 301 may have a frequency modulation characteristic that linearly changes (e.g., linearly increases or decreases) a carrier frequency. For another example, the frequency modulation model 301 may have a frequency modulation characteristic that nonlinearly changes a carrier frequency.

The frequency modulation model 301 is illustrated in FIG. 3 as having a frequency modulation characteristic that linearly increases a frequency over time. The chirp transmitter 311 may generate the FM signal 302 having a carrier frequency according to the frequency modulation model 301. For example, as illustrated in FIG. 3, the FM signal 302 may have a waveform of which a carrier frequency increases gradually in an interval, and a waveform of which the carrier frequency decreases gradually in a remaining interval. The chirp transmitter 311 may transmit the FM signal 302 to the duplexer 312.

The duplexer 312 may determine a signal transmission path and a signal reception path through the antenna 313. For example, while the radar sensor 310 is radiating the FM signal 302, the duplexer 312 may form a signal path from the chirp transmitter 311 to the antenna 313, and transmit the FM signal 302 to the antenna 313 through the formed signal path and then radiate it externally. While the radar sensor 310 is receiving a signal reflected from a target, the duplexer 312 may form a signal path from the antenna 313 to the spectrum analyzer 316. The antenna 313 may receive a signal that is returned to the antenna 313 after the radiated signal arrives at an obstacle and is then reflected from the obstacle. The radar sensor 310 may transmit the received signal to the spectrum analyzer 316 through the signal path that is formed from the antenna 313 to the spectrum analyzer 316. Here, the signal radiated through the antenna 313 may be referred to herein as a radar transmission signal, and the signal received through the antenna 313 may be referred to herein as a radar reception signal.

The frequency mixer 314 may demodulate a linear signal prior to the frequency modulation, for example, an original chirp signal, from the received signal. The amplifier 315 may amplify an amplitude of the demodulated linear signal.

The spectrum analyzer 316 may compare a frequency 308 of the radar reception signal that is received after being reflected from the target and a frequency 307 of the radar transmission signal. The frequency 307 of the radar transmission signal may change based on a carrier frequency change indicated by the frequency modulation model 301. The spectrum analyzer 316 may detect a difference between the frequency 308 of the radar reception signal and the frequency 307 of the radar transmission signal. Referring to a graph 309 illustrated in FIG. 3, such a frequency difference between the radar transmission signal and the radar reception signal may be constant during an interval in which a carrier frequency increases linearly along a time axis in the frequency modulation model 301, and be proportional to a range between the radar sensor 310 and the target. Thus, the range between the radar sensor 310 and the target may be derived from the frequency difference between the radar transmission signal and the radar reception signal. The spectrum analyzer 316 may transmit analyzed information to a processor of a radar signal processing apparatus.

In an example, a plurality of radar sensors may be installed in various portions of a vehicle, and the radar signal processing apparatus may calculate a range to a target, a direction, and a relative velocity in all directions of the vehicle based on information sensed by the radar sensors. The radar signal processing apparatus may be provided in the vehicle and provide various functions, for example, ACC, AEB, BSD, and LCA, that are useful for the vehicle to travel, using such calculated information.

Each of the radar sensors may externally radiate a radar transmission signal including a chirp signal of which a frequency is modulated based on a frequency modulation model, and receive a signal that is reflected from the target. The processor of the radar signal processing apparatus may determine the range to the target from each of the radar sensors based on a frequency difference between the radiated radar transmission signal and the received radar reception signal. In addition, when the radar sensor 310 includes a plurality of channels, the processor of the radar signal processing apparatus may derive a DoA of a radar reception signal reflected from a target, using phase information of radar data.

Figure 4:
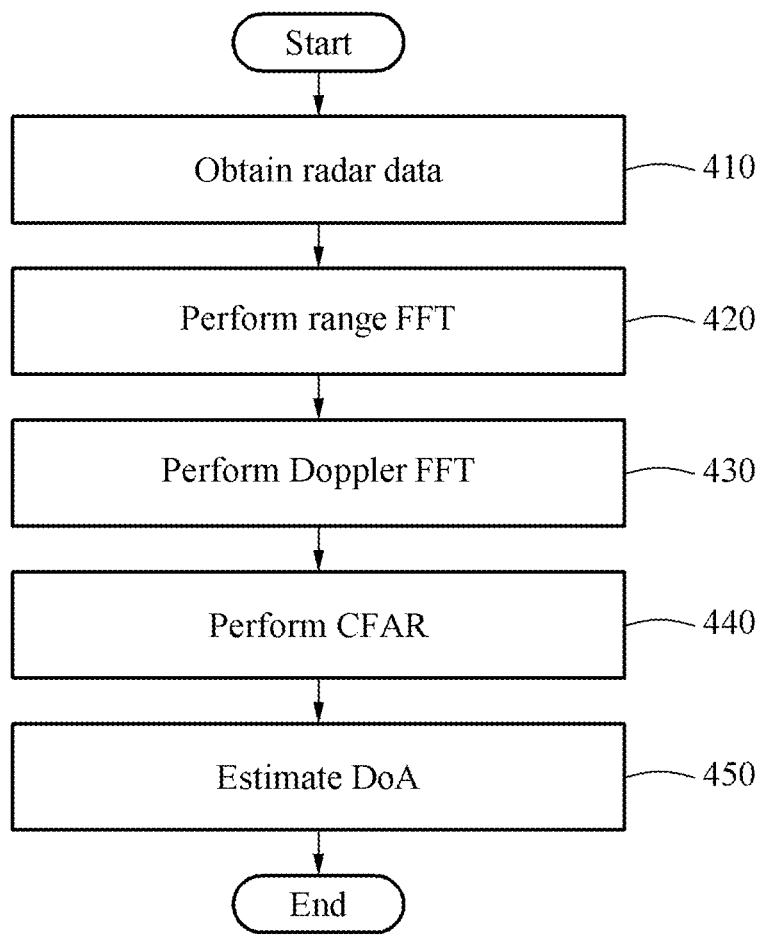
FIG. 4 illustrates a diagram illustrating an example of processing a radar signal.

FIG. 4 illustrates an example of processing a radar signal. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIG. 4, in operation 410, a radar signal processing apparatus obtains radar data. In an example, the radar signal processing apparatus may generate the radar data based on a radar transmission signal that is transmitted through an antenna array of a radar sensor based on a frequency modulation model and on a radar reception signal that is received through the antenna array when the radar transmission signal is reflected by a target. For example, the radar signal processing apparatus may generate an IF signal based on the radar transmission signal and the radar reception signal, and generate the radar data by performing sampling on the generated IF signal.

The radar signal processing apparatus may generate information associated with the target based on the radar data. For example, as illustrated, the radar signal processing apparatus performs a range FFT in operation 420, performs a Doppler FFT in operation 430, performs a CFAR operation in operation 440, and estimates a DoA in operation 450. Through these operations, the radar signal processing apparatus may obtain the information associated with the target that includes, for example, a range, a velocity, and a direction.

The radar data may be three-dimensional (3D) data in which respective axes may correspond to a time used for an electromagnetic wave to be received by a radar sensor after being transmitted, a change between transmitted chirp signals in one scan, and a change of chirp signals received by virtual antennas. The axes of the radar data may be converted to a range axis, a radial velocity or Doppler axis, and an angle or channel axis, through preprocessing. The radial velocity may indicate a relative velocity of the target with respect to the radar sensor observing the target.

For example, the radar signal processing apparatus may process the radar data in an order of the range FFT, the Doppler FFT, and the DoA estimation. However, since information corresponding to the axes of the radar data is not separable, the radar signal processing apparatus may also have a same result even when such a processing order is changed and an FFT and digital beamforming (DBF) are applied. For example, the angle axis may be an axis of a horizontal angle or an azimuth angle. Although the following description will focus on the azimuth angle, the angle axis may also be an angle of both the azimuth angle and an elevation angle.

For example, by the range FFT, the radar signal processing apparatus may obtain a range value by applying an FFT operation on a time in the radar data that is consumed from when an electromagnetic wave is transmitted to when the electromagnetic wave is received. In addition, by the DoA estimation, the radar signal processing apparatus may estimate an angle corresponding to the arrival direction in which the radar signal reflected from the target arrives. For example, the radar signal processing apparatus may estimate the DoA using, for example, a Bartlett algorithm, a minimum variance distortionless response (MVDR) algorithm, DBF, estimation of signal parameters via rotational invariant techniques (ESPRIT).

In addition, through the Doppler FFT, the radar signal processing apparatus may estimate a radial velocity (e.g., a Doppler velocity) from a signal change between chirp signals based on the Doppler axis. As the Doppler FFT, the radar signal processing apparatus may apply an FFT operation on a signal change between chirp signals at a certain range and angle, and obtain a radial velocity at the range and angle.

The CFAR operation may be a thresholding technique that adaptively sets a threshold for detecting a target to prevent a false alarm for the target. For example, the radar signal processing apparatus may apply a sliding window to the radar data to adaptively set a threshold and detect, as a target, a cell corresponding to a peak exceeding the threshold. In this example, the sliding window may include a cell under test (CUT) and neighboring cells around the CUT. In this example, the threshold may be determined using signal strength (e.g., noise floor) of the neighboring cells, and the target may be detected through a comparison between the threshold and signal strength of the CUT.

As described above, the radar data may include data associated with a plurality of channels. In such a case, the radar signal processing apparatus may perform an averaging operation on the data of the channels to generate mean data, and perform the CFAR operation on the generated mean data. The CFAR operation may fundamentally include numerous operations or computations, and thus performing the CFAR operation for each of the channels may impose an excessive load on a system.

Further, the radar signal processing apparatus may selectively perform the averaging operation according to a situation. For example, when there is mean data of a previous frame that is stored in advance and it is determined that the averaging operation is not needed to be performed additionally on a current frame, the radar signal processing apparatus may use the mean data of the previous frame when performing the CFAR operation on the current frame. Such skipping of the averaging operation may be performed based on various skip conditions. The skipping will be described in detail hereinafter.

The CFAR operation may be performed in a signal processing process of almost all types of sensors, for example, an ultrasonic sensor and a lidar sensor, in addition to a radar sensor. Although the CFAR operation is described herein as being performed in association with a radar sensor, the description provided herein may also be applicable to other sensors including, for example, an ultrasonic sensor and a lidar sensor. In such a case, terms, such as, for example, sensor data, ultrasonic sensor data, and lidar sensor data, may also be used in lieu of the term "radar data" used herein.

Figure 5:
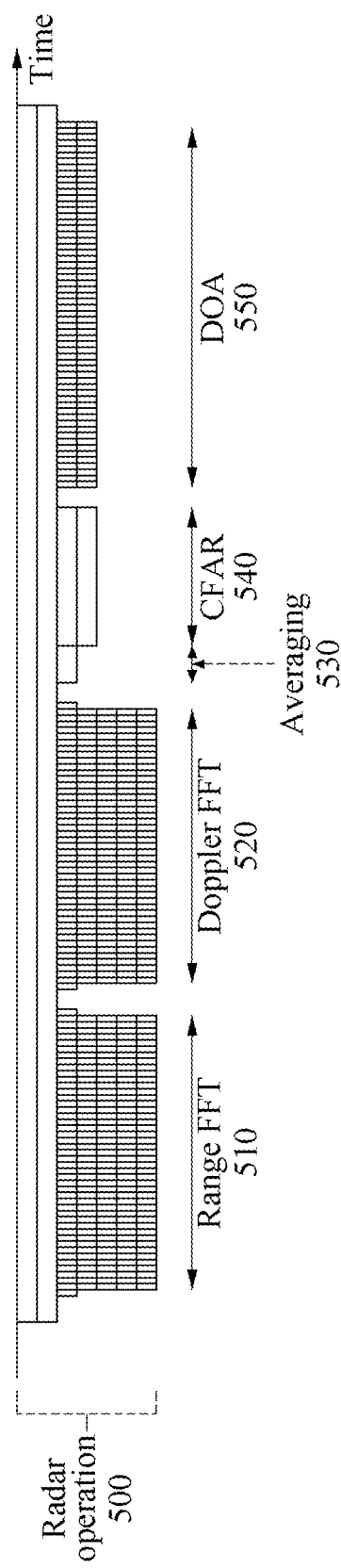
FIG. 5 illustrates an example of an operation amount of each radar operation performed in a process of processing a radar signal.

FIG. 5 illustrates an example of an operation amount of each radar operation performed in a process of processing a radar signal. An operation on a single frame of radar data will be described hereinafter with reference to FIG. 5. For example, a radar operation 500 may be performed in a process of processing a radar signal. Referring to FIG. 5, the radar operation 500 includes a range FFT 510, a Doppler FFT 520, an averaging operation 530, a CFAR operation 540, and DoA estimation 550. Each bar illustrated in FIG. 5 with respect to the radar operation 500 may indicate a sub-operation, for example, a function. An operation having a greater number of sub-operations to be performed may have longer and more bars.

When radar data includes data of a plurality of channels, the averaging operation 530 may be performed before the CFAR operation 540. Through the averaging operation 530 on the radar data, mean data may be generated. The CFAR operation 540 may be performed on the mean data, instead of being performed on the radar data for each of the channels. Since a greater number of operations are needed for the radar data as required radar performance (e.g. a resolution and a resolving power) increases, skipping an ineffective operation may be considered for the efficiency of an operation.

For example, the averaging operation 530 for the CFAR operation 540 may occupy not a few portions (e.g., 1 to 2%) in the radar operation 500. When there is not a great variation in radar data for each frame, for example, when a vehicle moves at a low speed, the averaging operation 530 may not be separately performed on a current frame, and the CFAR operation 540 may be performed on mean data calculated with a previous frame. Through this, the averaging operation 530 may be skipped when there is not a great variation in radar data, and thus an operation amount may be reduced greatly without the radar performance being degraded.

Figure 6:
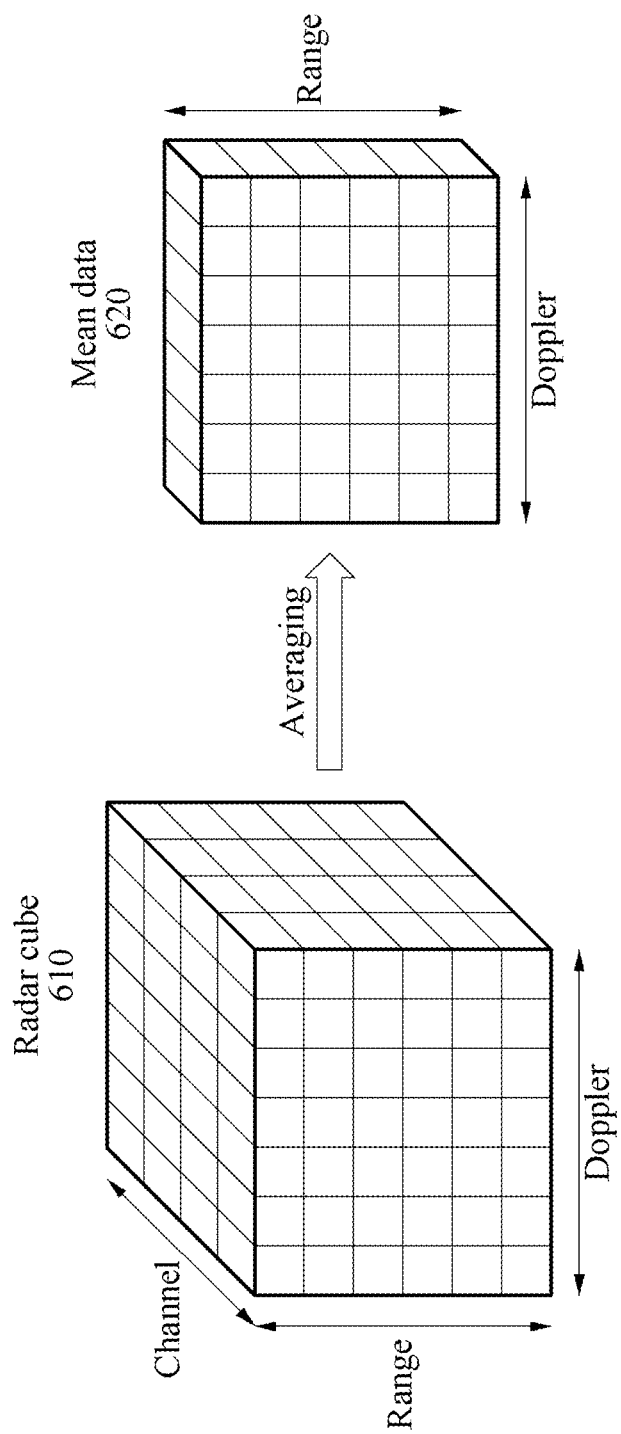
FIG. 6 illustrates an example of a radar cube and an example of mean data.

FIG. 6 illustrates an example of a radar cube and an example of mean data. Referring to FIG. 6, mean data 620 may be generated based on an averaging operation on a radar cube 610. The radar cube 610 may correspond to a single frame of radar data. That is, data such as the radar cube 610 may be present for each frame of the radar data. The radar cube 610 may be 3D data with a range axis, a Doppler axis, and a channel axis. The averaging operation may be performed in a channel direction of the radar cube 610. For example, through the averaging operation, cells of the radar cube 610 may be merged in the channel direction. Thus, a size of the mean data 620 may correspond to data of a single channel of the radar cube 610.

In an example, two-dimensional (2D) data corresponding to the single channel of the radar cube 610 may be referred to as a range-Doppler map. In this example, it is construed that the averaging operation may be performed on range-Doppler maps of channels of the radar cube 610 and the mean data 620 may then be generated. For example, a radar signal processing apparatus may obtain a channel index-based list of range-Doppler maps and perform the averaging operation on the radar cube 610 based on the list.

Figure 7:
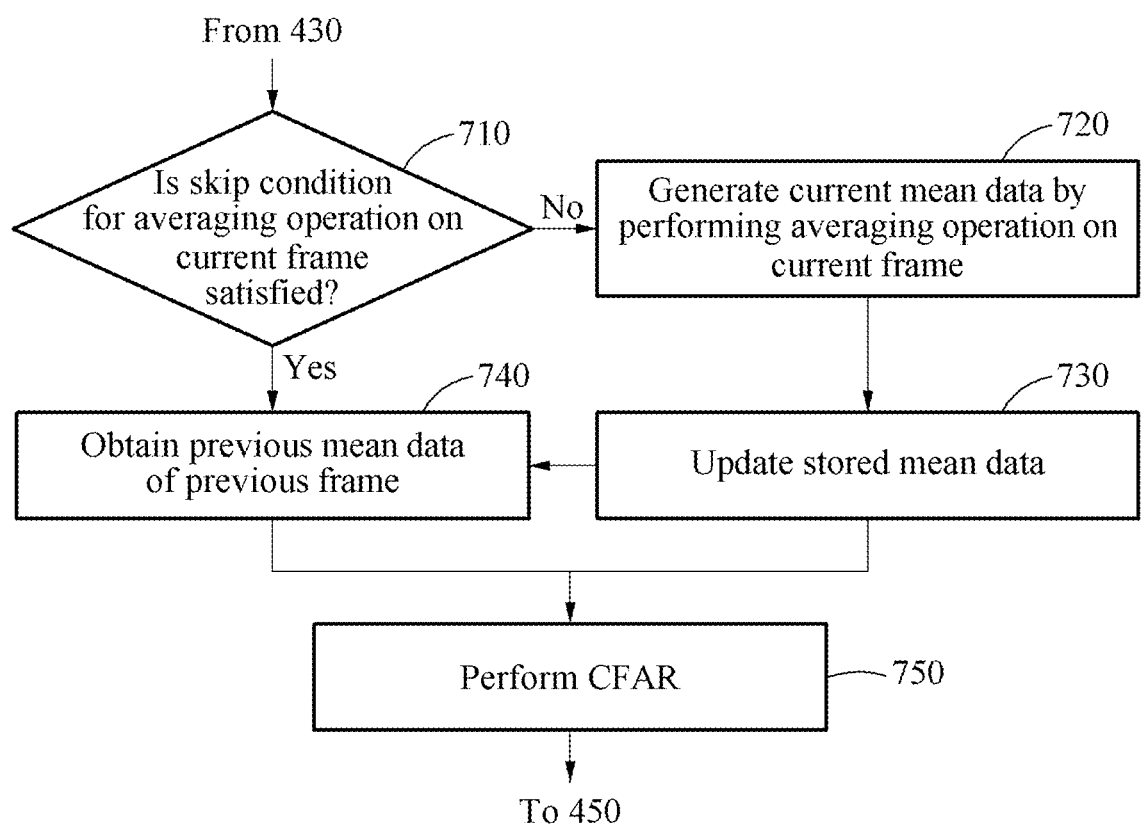
FIG. 7 illustrates a diagram illustrating an example of subsequent operations associated with skipping of an averaging operation.

FIG. 7 illustrates an example of subsequent operations associated with skipping of an averaging operation. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer, such as a processor, that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

Referring to FIG. 7, in operation 710, a radar signal processing apparatus determines whether a skip condition for an averaging operation on a current frame of radar data is satisfied. In an example, the radar signal processing apparatus may determine whether the skip condition for the current frame is satisfied based on a data variation level of the current frame of the radar data. The skip condition will be described in detail hereinafter. In an example, operation 710 may be performed after FFT operations are completed. For example, operation 710 may be performed after operation 430 of performing a Doppler FFT described above with reference to FIG. 4 is performed.

In response to a determination that the skip condition for the current frame is not satisfied, operation 720 may be performed. In operation 720, the radar signal processing apparatus generates current mean data by performing the averaging operation on the current frame. For example, the radar signal processing apparatus may generate the current mean data by performing the averaging operation on range-Doppler maps of receiving channels of the current frame.

In operation 730, the radar signal processing apparatus updates stored mean data. For example, the radar signal processing apparatus may store, in a memory, the current mean data generated in operation 720. Thus, the mean data previously stored in the memory may be updated to be the current mean data. The mean data stored in the memory may be used for a CFAR operation by being loaded from the memory as a subsequent skip operation is performed.

In response to a determination that the skip condition for the current frame is satisfied, operation 740 may be performed. In operation 740, the radar signal processing apparatus obtains previous mean data of a previous frame of the radar data. For example, the radar signal processing apparatus may load the previous mean data from the memory. In such a case, the averaging operation on the current frame may be skipped.

When the data variation level of the current frame is relatively low, a result of performing the CFAR operation with the current mean data may not be significantly different from a result of performing the CFAR operation with the previous mean data. For example, when a velocity of a vehicle is low, a change in background may be small but a change in some objects such as other vehicles may be large. In the radar data, a dominant portion may be the background and a small portion may be the other objects, and thus accuracy may not be compromised even when the CFAR operation is performed with the previous mean data.

In operation 750, the radar signal processing apparatus performs the CFAR operation. The radar signal processing apparatus may perform the CFAR operation on the current frame based on one of the previous mean data and the current mean data. For example, when the skip condition for the current frame is satisfied, the previous mean data obtained in operation 740 may be used. However, when the skip condition for the current frame is not satisfied, the current mean data generated in operation 720 may be used.

In an example, after operation 750 is performed, operation 450 of estimating a DoA described above with reference to FIG. 4 may be performed. For example, when a result of performing the CFAR operation on the current frame is generated, a DoA of the current frame may be estimated based on the result of performing the CFAR operation in operation 450.

The operations described above with reference to FIG. 7 may be performed repeatedly on each frame. In such a case, an averaging operation may be omitted for a frame and performed on another frame, thereby mean data may be generated. For example, whether a skip condition for an averaging operation on a first frame of radar data is satisfied may be determined based on a data variation level of the first frame. In this example, in response to the skip condition for the first frame not being satisfied, the averaging operation may be performed on the first frame, thereby first mean data may be generated and then stored in a memory. A CFAR operation may be performed on the first frame based on the first mean data. In an example, whether a skip condition for an averaging operation on a second frame of the radar data is satisfied may be determined based on a data variation level of the second frame. In response to the skip condition for the second frame being satisfied, the first mean data may be loaded from the memory, and a CFAR operation may be performed on the second frame based on the first mean data.

Figure 8:
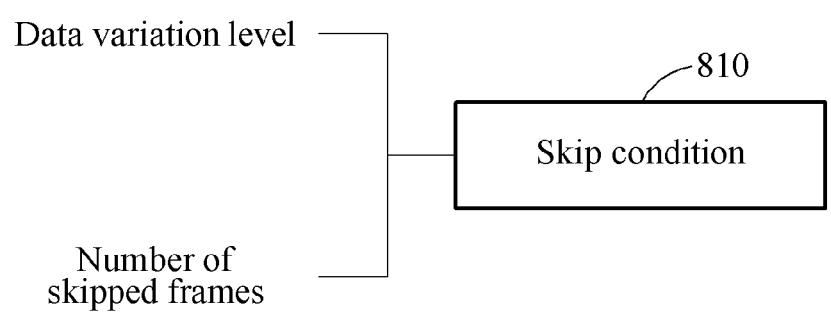
FIG. 8 illustrates an example of an element that determines a skip condition.

FIG. 8 illustrates an example of an element that determines a skip condition. Referring to FIG. 8, whether a skip condition 810 is satisfied or not may be determined based on a data variation level and the number of frames skipped up to a current point in time. However, both the data variation level and the number of the skipped frames may not have to be considered. For example, to determine whether the skip condition 810 is satisfied or not, only the data variation level may be considered.

The data variation level may indicate a level of a change in data between frames. For example, a data variation level of a current frame may indicate a level of a change between data of the current frame and data of at least one previous frame prior to the current frame. For example, when the change in the data between the frames is great, the data variation level may be great or high. In contrast, when the change in the data between the frames is small, the data variation level may be small or low.

In an example, the data variation level may be indirectly estimated from other data indicating the change in the data, instead of a direct comparison of the data between the frames. For example, the data variation level may be estimated based on at least one of an ego velocity of a vehicle or frames per second (FPS) of a radar sensor. The ego velocity of the vehicle may correspond to a velocity measured at a time at which each frame is generated.

For example, when the skip condition 810 (refer to FIG. 8 above) for a current frame is determined to be satisfied, a velocity of the vehicle measured at a time at which the current frame is generated may be considered. For example, when the ego velocity of the vehicle is less than a velocity threshold (e.g., 15 kilometers per hour [km/h]), the skip condition 810 may be determined to be satisfied. In addition, when the FPS of the radar sensor is greater than a FPS threshold (e.g., 30 FPS), the skip condition 810 may be determined to be satisfied. Each of the foregoing thresholds may be practically or empirically determined through experiments, or theoretically determined through calculations.

When the number of frames skipped up to a current point in time is considered for determining whether the skip condition 810 is satisfied or not, it is possible to prevent a skip operation from being performed by an excessive number of times, and improve stability of radar information. For example, when only the data variation level is considered while the vehicle is traveling at a low speed for a long period of time, an averaging operation may be omitted for an excessive number of frames. Thus, based further on the number of the skipped frames, whether a skip condition for an averaging operation is satisfied or not may be determined. Here, the current point in time may indicate a current time at which whether to skip a current frame is determined.

For example, in response to the number of the skipped frames being greater than a skip threshold, the skip condition may be determined not to be satisfied. In this example, an averaging operation may be performed on a current frame, and stored mean data may be updated. In addition, in such a case in which the number of the skipped frames exceeds the skip threshold, the averaging operation may be performed without considering the data variation level. Thus, when the number of the skipped frames is considered, it may be construed that the number of the skipped frames is considered preferentially over the data variation level.

Figure 9:
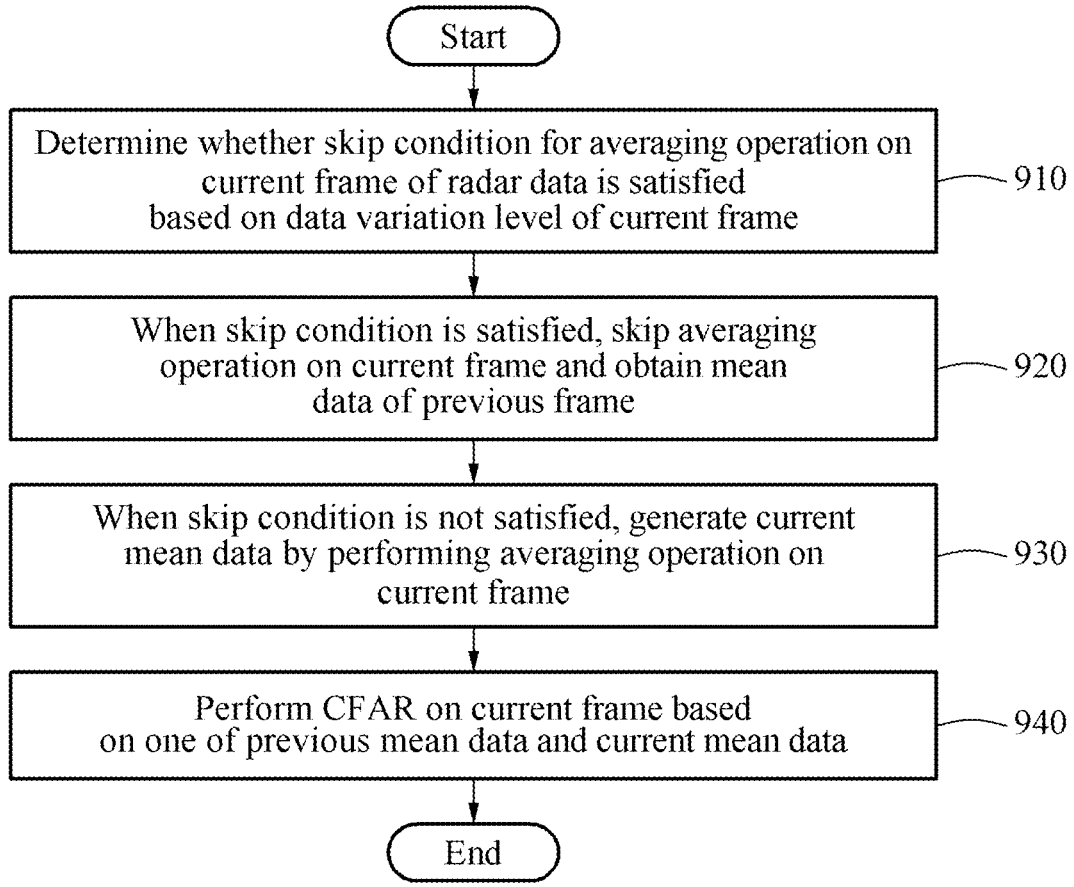
FIG. 9 illustrates a diagram illustrating an example of a radar signal processing method.

FIG. 9 illustrates an example of a radar signal processing method. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer, such as a processor, that perform the specified functions, or combinations of special purpose hardware and computer instructions. In addition to the description of FIG. 9 below, the descriptions of FIGS. 1-8 are also applicable to FIG. 9, and are incorporated herein by reference. Thus, the above description may not be repeated here.

Referring to FIG. 9, in operation 910, a radar signal processing apparatus determines whether a skip condition for an averaging operation on a current frame of radar data is satisfied based on a data variation level of the current frame. In operation 920, when the skip condition is satisfied, the radar signal processing apparatus skips the averaging operation on the current frame and obtains previous mean data of a previous frame of the radar data. In operation 930, when the skip condition is not satisfied, the radar signal processing apparatus generates current mean data by performing the averaging operation on the current frame. In operation 940, the radar signal processing apparatus performs a CFAR operation on the current frame based on one of the previous mean data and the current mean data. For a more detailed description of the radar signal processing method described above with reference to FIG. 9, reference may be made to what is described above with reference to FIGS. 1 through 8 and what is to be described hereinafter with reference to FIG. 10.

Figure 10:
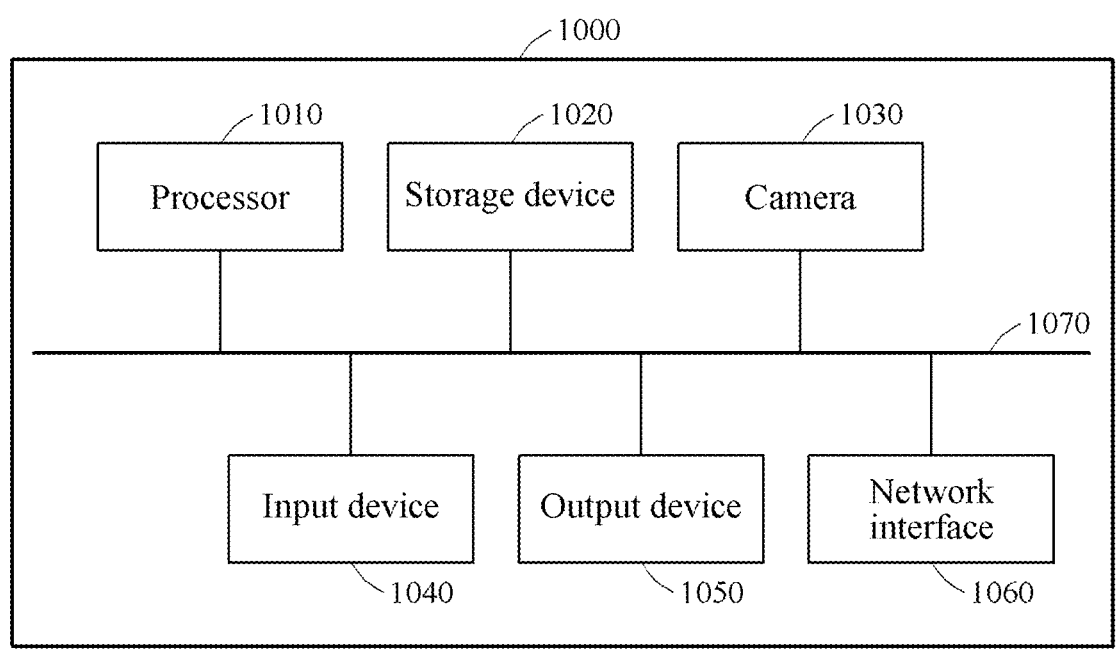
FIG. 10 illustrates an example of an electronic apparatus.

FIG. 10 illustrates an example of an electronic apparatus. An electronic apparatus 1000 may perform a radar signal processing method described above. For example, the electronic apparatus 1000 may include the radar signal processing apparatus 200 of FIG. 2 functionally and/or structurally. The electronic apparatus 1000 may be, for example, an image processing device, a smartphone, a wearable device, a tablet computer, a netbook, a laptop, a desktop, a personal digital assistant (PDA), a head-mounted display (HMD), a vehicle (e.g., an autonomous or self-driving vehicle), and a driver assistance device or system provided in a vehicle.

Referring to FIG. 10, the electronic apparatus 1000 includes a processor 1010, a storage device 1020, a camera 1030, an input device 1040, the output device 1050, and a network interface 1060. The processor 1010, the storage device 1020, the camera 1030, the input device 1040, the output device 1050, and the network interface 1060 may communicate with one another through a communication bus 1070.

The processor 1010 may execute functions and instructions in the electronic apparatus 1000. For example, the processor 1010 may process instructions stored in the storage device 1020. The processor 1010 may perform one or more, or all, of the methods or operations described above with reference to FIGS. 1 through 9.

The storage device 1020 may store information or data needed for the processor 1010 to operate. For example, calculated mean data may be stored in the storage device 1020. The storage device 1020 may include a non-transitory computer-readable storage medium or device. The storage device 1020 may store instructions to be executed by the processor 1010, and store related information while software or an application is being executed by the electronic apparatus 1000.

The camera 1030 may capture an image including a plurality of image frames. For example, the camera 1030 may generate a frame image.

The input device 1040 may receive an input from a user through a tactile input, a video input, an audio input, a gesture input, or a touch input. The input device 1040 may include, for example, a keyboard, a mouse, a touchscreen, a microphone, and other devices that may detect the input from the user and transfer the detected input.

The output device 1050 may provide an output of the electronic apparatus 1000 to a user through a visual, auditory, or tactile channel. The output device 1050 may include, for example, a display, a touchscreen, a speaker, a vibration generator, and other devices that may provide the user with the output. The network device 1060 may communicate with an external device through a wired or wireless network. In an example, the output device 1050 may provide a user with a result of processing radar data using at least one of visual information, auditory information, or haptic information.

For example, when the electronic apparatus 1000 is provided in a vehicle, the electronic apparatus 1000 may visualize a radar image map through a display. For another example, the electronic apparatus 1000 may change at least one of a velocity, an acceleration, or steering of the vehicle in which the electronic apparatus 1000 is provided based on DoA information, range information, and/or a radar image map. However, examples are not limited to the foregoing, and the electronic apparatus 1000 may perform functions, such as, for example, ACC, AEB, BSD, LCA, and ego-localization. The electronic apparatus 1000 may structurally and/or functionally include a control system for controlling the vehicle.

The radar signal processing apparatus, electronic apparatus, chip transmitter 311, duplexer 312, frequency mixer 314, amplifier 315, spectrum analyzer 316, and other apparatuses, devices, units, modules, and components described herein with respect to FIGS. 1, 2, 3, and 10 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an FPGA, a programmable logic unit (PLU), a central processing unit (CPU), a graphics processing unit (GPU), a neural processing unit (NPU), or any other device capable of responding to and executing instructions in a defined manner.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the radio detection and ranging (radar) signal processing method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A radio detection and ranging (radar) signal processing method of a radar senor, comprising:
   determining whether a skip condition for an averaging operation on a current frame of radar data is satisfied based on a data variation level of the current frame;
   skipping the averaging operation on the current frame and obtaining previous mean data of a previous frame of the radar data, in response to the skip condition being satisfied;
   generating current mean data by performing the averaging operation on the current frame, in response to the skip condition not being satisfied; and
   performing a constant false alarm rate (CFAR) operation on the current frame based on one of the previous mean data or the current mean data,
   wherein the data variation level is estimated based on at least one of an ego velocity of a vehicle having the radar sensor or frames per second (FPS) of the radar sensor.

2. The radar signal processing method of claim 1, wherein the determining of whether the skip condition is satisfied comprises:
   determining that the skip condition is satisfied, in response to an ego velocity of a vehicle having the radar sensor being less than a velocity threshold.

3. The radar signal processing method of claim 1, wherein the determining of whether the skip condition is satisfied comprises:
   determining that the skip condition is satisfied, in response to the frame per second (FPS) of the radar sensor being greater than a threshold.

4. The radar signal processing method of claim 1, wherein the skip condition for the averaging operation on the current frame is based on the number of frames skipped up to a current point in time.

5. The radar signal processing method of claim 1, further comprising:
   determining that the skip condition is not satisfied, in response to the number of frames skipped up to a current point in time being greater than a skip threshold.

6. The radar signal processing method of claim 1, wherein the generating of the current mean data comprises:
   performing the averaging operation on range-Doppler maps of channels of the current frame.

7. The radar signal processing method of claim 1, wherein a direction of arrival (DoA) of the current frame is estimated based on a result of performing the CFAR operation on the current frame.

8. The radar signal processing method of claim 7, wherein a vehicle comprising an apparatus implementing the radar signal processing method is configured to be controlled based on the estimated DoA.

9. The radar signal processing method of claim 1, wherein the radar data is generated based on a radar reception signal received through an antenna array of the radar sensor.

10. A non-transitory computer-readable storage medium storing instructions, the instructions when executed by a processor, cause the processor to perform the radar signal processing method of claim 1.

11. A radio detection and ranging (radar) signal processing method of a radar sensor, comprising:
    determining whether a skip condition for an averaging operation on a first frame of radar data is satisfied based on a data variation level of the first frame;
    generating first mean data by performing the averaging operation on the first frame, in response to the skip condition for the first frame not being satisfied;
    storing the first mean data in a memory;
    performing a constant false alarm rate (CFAR) operation on the first frame based on the first mean data;
    determining whether a skip condition for an averaging operation on a second frame of the radar data is satisfied based on a data variation level of the second frame;
    loading the first mean data from the memory, in response to the skip condition for the second frame being satisfied; and performing a CFAR operation on the second frame based on the first mean data,
wherein the data variation level of the first frame is based on at least one of an ego velocity of a vehicle having the radar sensor or frames per second (FPS) of the radar sensor.

12. The radar signal processing method of claim 11, further comprising:
determining the skip condition for the averaging operation on the first frame based on the number of frames skipped up to a current point in time.

13. A radio detection and ranging (radar) signal processing apparatus, comprising:
a radar sensor configured to transmit a radar transmission signal through an antenna array, and to receive a radar reception signal through the antenna array in response to the radar transmission signal being reflected by a target; and
a processor configured to generate radar data based on the radar transmission signal and the radar reception signal, to determine whether a skip condition for an averaging operation on a current frame of the radar data is satisfied based on a data variation level of the current frame, to skip the averaging operation on the current frame and obtain previous mean data of a previous frame of the radar data in response to the skip condition being satisfied, and to perform a constant false alarm rate (CFAR) operation on the current frame based on the previous mean data,
wherein the data variation level of the current frame is based on at least one of an ego velocity of a vehicle having the radar sensor or frames per second (FPS) of the radar sensor.

14. The radar signal processing apparatus of claim 13, wherein the processor is further configured to determine whether the skip condition for the averaging operation on the current frame is satisfied based further on the number of frames skipped up to a current point in time.

15. A vehicle comprising:
a radio detection and ranging (radar) sensor configured to transmit a radar transmission signal through an antenna array, and receive a radar reception signal through the antenna array in response to the radar transmission signal being reflected by a target;
a processor configured to generate radar data based on the radar transmission signal and the radar reception signal, to determine whether a skip condition for an averaging operation on a current frame of the radar data is satisfied based on a data variation level of the current frame, to skip the averaging operation on the current frame and obtain previous mean data of a previous frame of the radar data in response to the skip condition being satisfied, and to perform a constant false alarm rate (CFAR) operation on the current frame based on the previous mean data; and
a controller configured to control the vehicle based on a direction of arrival (DoA) estimated based on the CFAR operation,
wherein the data variation level of the current frame is estimated based on at least one of an ego velocity of the vehicle or frames per second (FPS) of the radar sensor.

16. The vehicle of claim 15, wherein the processor is further configured to determine the skip condition for the averaging operation on the current frame based on the number of frames skipped up to a current point in time.

* * * * *